US009849912B2

(12) United States Patent
Gong et al.

(10) Patent No.: US 9,849,912 B2
(45) Date of Patent: Dec. 26, 2017

(54) VEHICLE BODY ANTI-COLLISION STRUCTURE

(71) Applicant: SHENZHEN ZHILUN DRIVING TECHNOLOGY FOR ELECTRIC VEHICLE CO., LTD., Guangdong (CN)

(72) Inventors: Shugang Gong, Guangdong (CN); Ping Yang, Guangdong (CN); Changwei Zhu, Guangdong (CN); Zhihua Hu, Guangdong (CN); Jinjun Li, Guangdong (CN)

(73) Assignee: SHENZHEN ZHILUN DRIVING TECHNOLOGY FOR ELECTRIC VEHICLE CO., LTD., Guangdong (CN)

( * ) Notice: Subject to any disclaimer, the term of this patent is extended or adjusted under 35 U.S.C. 154(b) by 0 days.

(21) Appl. No.: 15/300,543

(22) PCT Filed: Apr. 1, 2014

(86) PCT No.: PCT/CN2014/074562
§ 371 (c)(1),
(2) Date: Sep. 29, 2016

(87) PCT Pub. No.: WO2015/149290
PCT Pub. Date: Oct. 8, 2015

(65) Prior Publication Data
US 2017/0106907 A1 Apr. 20, 2017

(51) Int. Cl.
B62D 21/15 (2006.01)
B62D 21/16 (2006.01)
(Continued)

(52) U.S. Cl.
CPC .............. B62D 21/15 (2013.01); B60R 19/02 (2013.01); B60R 19/18 (2013.01); B60R 19/20 (2013.01);
(Continued)

(58) Field of Classification Search
CPC ...... B60R 19/205; B62D 24/02; B62D 21/02; B62D 21/15
(Continued)

(56) References Cited

U.S. PATENT DOCUMENTS 3,557,894 A * 1/1971 Hanley ................ B62D 21/183
180/312
6,702,058 B2 * 3/2004 Ishii .......................... B62K 5/01
180/311
(Continued)

FOREIGN PATENT DOCUMENTS

CN 2152714 Y 1/1994
CN 2410184 Y 12/2000
(Continued)

OTHER PUBLICATIONS

International Search Report of PCT/CN2014/074562 dated Dec. 30, 2014.
(Continued)

Primary Examiner — James A English
(74) Attorney, Agent, or Firm — Wenderoth, Lind & Ponack, L.L.P.

(57) ABSTRACT

A vehicle body anti-collision structure, which is mounted within a vehicle body covering and used for buffering an impact force applied to a vehicle body, the structure having two buffering frames capable of buffering the applied impact force and a connecting frame, wherein the connecting frame is disposed at the bottom end of the vehicle body and fixed to a chassis of the vehicle body, and the two buffering frames are respectively disposed at the front end and rear end of the vehicle body and are fixed to both ends of the connecting frame. The above-mentioned vehicle body anti-collision structure is of an overall structure, such that when the buffering frames at the front and rear of the vehicle body are impacted, the impact force will be dispersed to the whole vehicle body anti-collision structure and the chassis, instead (Continued)

of being completely withstood by themselves, so that a greater impact force can be withstood, improving the safety of the vehicle body.

10 Claims, 3 Drawing Sheets

(51) Int. Cl.
*B60R 19/02* (2006.01)
*B60R 19/20* (2006.01)
*B60R 19/18* (2006.01)
*B60R 21/16* (2006.01)

(52) U.S. Cl.
CPC ............ *B60R 21/16* (2013.01); *B62D 21/152* (2013.01); *B62D 21/16* (2013.01); *B60R 2019/186* (2013.01)

(58) Field of Classification Search
USPC .......................................................... 280/798
See application file for complete search history.

(56) References Cited

U.S. PATENT DOCUMENTS

| 7,306,069 | B2* | 12/2007 | Takeshima | ............. B62K 19/00 180/312 |
| 9,561,765 | B1* | 2/2017 | Barbat | .................. B60R 19/205 |
| 2003/0146036 | A1 | 8/2003 | Nording | |
| 2005/0161273 | A1* | 7/2005 | Makita | .................. B60R 19/205 180/274 |
| 2006/0066069 | A1* | 3/2006 | Yanai | ........................ B62K 5/01 280/124.135 |
| 2006/0192375 | A1* | 8/2006 | Davis | ........................ B60G 3/06 280/781 |
| 2008/0084093 | A1* | 4/2008 | Kishima | ................ B62D 27/04 296/203.03 |

FOREIGN PATENT DOCUMENTS

| CN | 1544270 A | 11/2004 |
| CN | 2889798 Y | 4/2007 |
| CN | 201158359 Y | 12/2008 |

OTHER PUBLICATIONS

Espacenet bibliographic data for CN Publication No. 1544270 dated Nov. 10, 2004, 1 page.
Espacenet bibliographic data for CN Publication No. 2152714 dated Jan. 12, 1994, 1 page.
Espacenet bibliographic data for CN Publication No. 201158359 dated Dec. 3, 2008, 1 page.
Espacenet bibliographic data for CN Publication No. 2889798 dated Apr. 18, 2007, 1 page.
Espacenet bibliographic data for CN Publication No. 2410184 dated Dec. 13, 2000, 1 page.

* cited by examiner

VEHICLE BODY ANTI-COLLISION STRUCTURE

TECHNICAL FIELD

The present application relates to the technical field of vehicle safety, and more particularly, relates to a vehicle body anti-collision structure.

BACKGROUND

With the increase of the number of vehicles, traffic accidents occur more and more frequently; how to try the best to protect the safety of passengers in traffic accidents becomes a major research direction of vehicle safety.

Anti-collision structure is an accessory structure mounted at a periphery of a main structure of a vehicle body, and can be deformed in a collision so as to absorb an impact force and protect the vehicle body. Most anti-collision structures in the prior art are independent structures, such as a front bumper, a rear bumper, and so on. When the vehicle body suffers an impact force, the impact force will entirely concentrate on one of the independent anti-collision structures; once the impact force exceeds the bearing limit of the anti-collision structure, the anti-collision structure will be deformed and fractured and then loss the anti-collision capability. The aforesaid anti-collision structures can only provide very limited protection to the vehicle body and can't meet the requirement of vehicle safety.

Technical Problem

A purpose of the present invention is providing a vehicle body anti-collision structure, which aims at solving a problem in the prior art that a vehicle body anti-collision structure has a poor impact force bearing capability and can't meet the requirement of vehicle safety.

Technical Solution

The present invention is implemented as follows: a vehicle body anti-collision structure mounted on a periphery of a vehicle body and configured for buffering an impact force applied to a vehicle body, wherein the vehicle body anti-collision structure comprises two buffering frames configured for buffering a received impact force and a connecting frame; the connecting frame is positioned at a bottom end of the vehicle body and fixed to a chassis of the vehicle body, the two buffering frames are respectively positioned at a front end and a rear end of the vehicle body and fixed to two ends of the connecting frame.

Further, each of the buffering frames comprises a plurality of bent pipes arranged in parallel, and each of the bent pipes has a middle portion bent outwards, an upper end abuts against the vehicle body, and a lower end connected to the connecting frame.

Furthermore, the upper end of each of the bent pipes is sheathed by a buffering rubber mat, and a tail end of the buffering rubber mat expands to be trumpet-shaped and abuts against the vehicle body.

Furthermore, the buffering frame further comprises an air-cushion, and the air-cushion is arranged between bent parts of the bent pipes and the vehicle body.

Furthermore, the connecting frame comprises a plurality of longitudinal rods and a plurality of horizontal rods arranged in parallel respectively, the two buffering frames are connected to two ends of each of the longitudinal rods respectively; each of the horizontal rods has one end connected with the longitudinal rods and another end connected with the chassis.

Furthermore, each of the longitudinal rods comprises a front longitudinal rod and a rear longitudinal rod independent from each other, each of the longitudinal rods and the horizontal rods has one end connected to the buffering frame and another end connected to a crossbeam of the chassis of the vehicle body.

Furthermore, each of the front longitudinal rods and the rear longitudinal rods is constituted by a plurality of rod bodies connected end to end, and elastic buffering members are arranged at connection joints between the rod bodies.

Furthermore, a connecting end of each of the rod bodies is provided with a plurality of insertion holes, the elastic buffering members are elastic rubber blocks, and two ends of each of the elastic rubber blocks are provided with a plurality of plug connectors configured to be inserted into and fixed within the insertion holes.

Furthermore, each of the rod body comprises a straight rod extending straightly and a bent rod having a curved shape.

Furthermore, the bent rod is provided with a vibration absorbing frame configured for enhancing the strength of a bent part of the bent rod, and the vibration absorbing frame is fixed to the bent rod through two uprights.

Furthermore, the vehicle body anti-collision structure further comprises a plurality of air bags arranged at an inner side of the vehicle body.

Advantageous Effects of the Present Invention

Compared with the prior art, the vehicle body anti-collision structure provided by the present invention comprises two buffering frames and a connecting frame, the two buffering frames are arranged at a front end and a rear end of the vehicle body respectively, and are connected into one piece through the connecting frame. When the front end or the rear end of the vehicle body suffers an impact force, the buffering frames absorb the impact force and transfer the impact force to the connecting frame, and the connecting frame transfers the impact force to a chassis, such that the impact force is dispersed to the whole vehicle body anti-collision structure and the chassis, an impact bearing capability of the vehicle body anti-collision structure can thus be improved, and a safety of the vehicle is enhanced.

DETAILED DESCRIPTION OF THE PREFERRED EMBODIMENT

In order to make the purposes, technical solutions, and advantages of the present invention be clearer and more understandable, the present invention will be further described in detail hereinafter with reference to the accompanying drawings and embodiments. It should be understood that the embodiments described herein are only intended to illustrate but not to limit the present invention.

Hereinafter, an implementation of this embodiment will be described in detail with reference to specific accompanying drawings.

Figure 1:
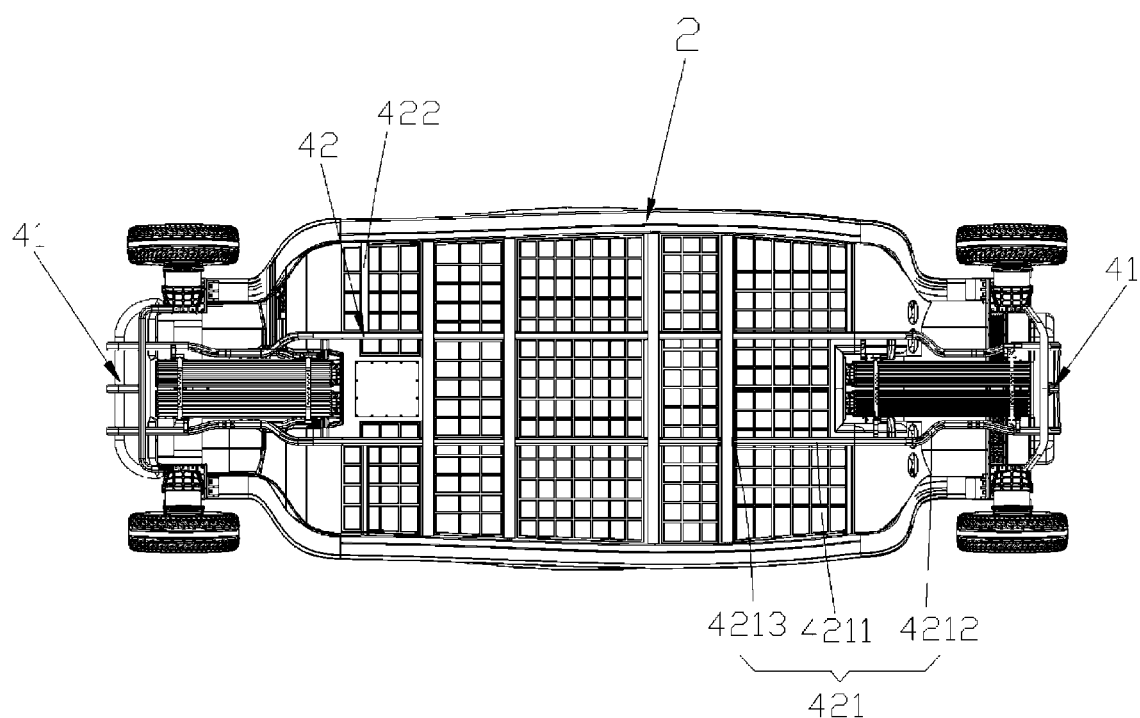
FIG. 1 illustrates a bottom schematic view of a vehicle body anti-collision structure provided by an embodiment of the present invention.

As shown in FIG. 1, the vehicle body anti-collision structure comprises two buffering frames 41 positioned at a front end and a rear end of an interior of a vehicle body 1 respectively and a connecting frame 42 positioned at a bottom end of the vehicle body 1. The two buffering frames 41 are respectively fixed to two ends of the connecting frame 42 and positioned in an interior of a covering member (e.g., a shell of a vehicle) of the vehicle body 1, and the connecting frame 42 is fixed on a chassis 2 of the vehicle body 1.

The two buffering frames 41 are respectively arranged at the front end and the rear end of the interior of the vehicle body 1 and thus can bear impact forces in a collision; the impact forces suffered by the buffering frames 41 are transferred to the connecting frame 42 and the chassis 2, thereby dispersing the impact forces to the whole vehicle body anti-collision structure and the chassis 2, but not leaving the buffering frames 41 to bear the entire impact forces. Compared with an independently arranged buffering frame in the prior art, the buffering frame 41 in this embodiment does not need to change the structure and the material thereof but can bear a larger impact force, such that an impact bearing capability of the vehicle body can be enhanced, and a driving safety can be improved. Since the vehicle body anti-collision structure in this embodiment has a better capability of absorbing impact force a volume of the vehicle body anti-collision structure can be reduced while enough anti-collision capability is still ensured; the vehicle body anti-collision structure is positioned inside the vehicle body 1, not only can a volume of the vehicle body 1 be reduced, but also a periphery of the vehicle body 1 can be further provided with a conventional buffering frame, such that the anti-collision capability of the vehicle body 1 is further enhanced.

Figure 2:
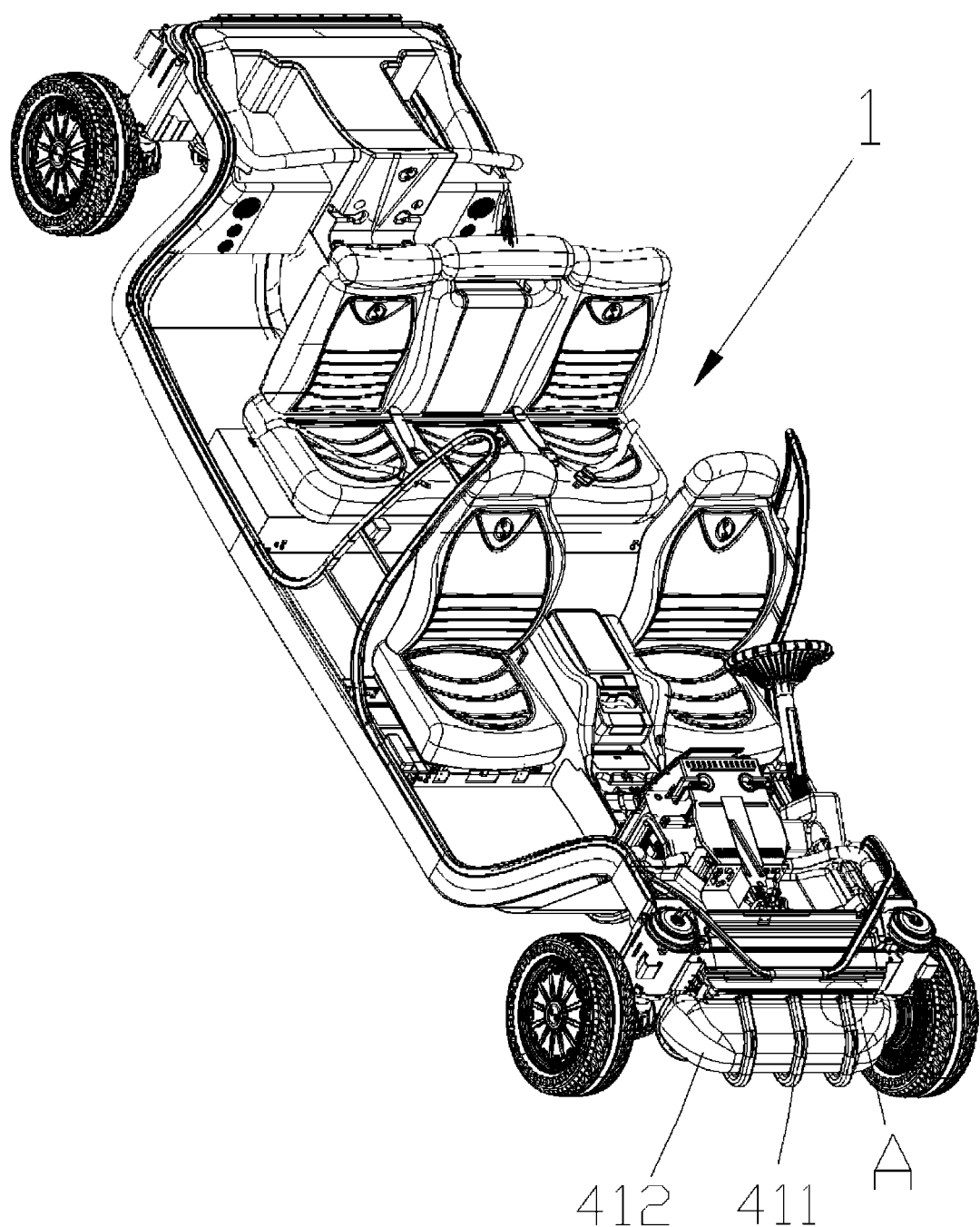
FIG. 2 illustrates an axonometric schematic view of the vehicle body anti-collision structure provided by the embodiment of the present invention.
Figure 3:
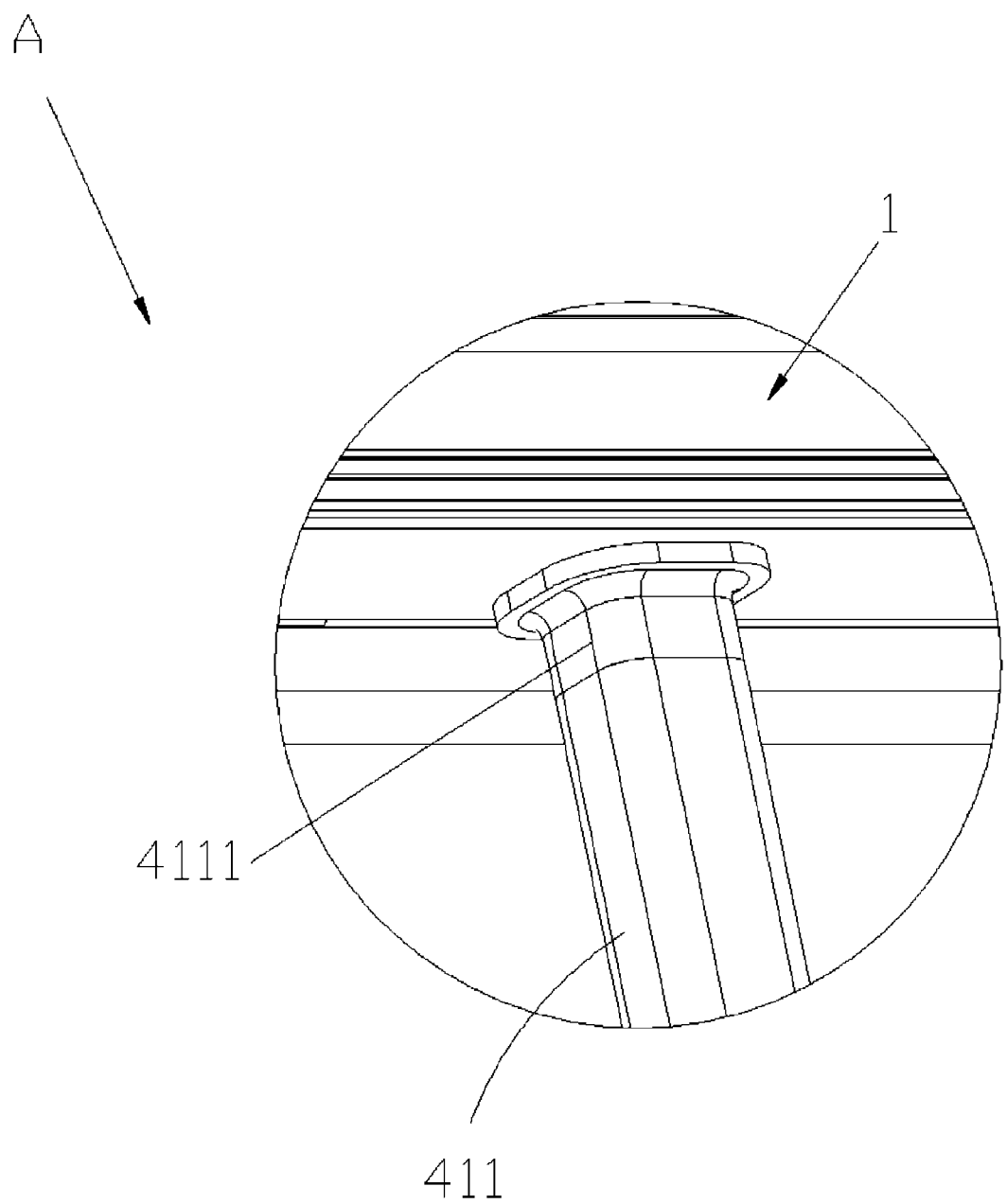
FIG. 3 illustrates a partially enlarged schematic view of the portion A in FIG. 2.

As shown in FIG. 2 and FIG. 3, each of the buffering frames 41 comprises a plurality of bent pipes 411 arranged in parallel; and each bent pipe 411 has a middle portion bent outwards, an upper end abutting against the vehicle body 1, and a lower end connected with the connecting frame 42, thereby forming a bumper structure. The upper end of each of the bent pipes 411 abutting against the vehicle body 1 is sheathed by a buffer rubber pad 4111, a tail end of the buffer rubber pad. 411.1 expands to be trumpet-shaped and abuts against the vehicle body 1. When the buffering frames 41 is impacted, the plurality of bent pipes 411 can absorb a part of the impact force by deformation of themselves, and the buffering rubber mats 4111 sheathed on the upper ends of the bent pipes 411 can absorb another part of the impact force by deformation of themselves, such that a pressure of the bent pipes 411 applied to the vehicle body 1 can be reduced. The Trumpet-shaped structure at the tail end enlarges a contact area between the buffering rubber pad 4111 and the vehicle body 1 and disperses intensity of pressure, such that the bent pipes 411 are not prone to crush the vehicle body 1 when they are subjected to impact forces.

As shown in FIG. 2, in order to enhance impact absorbing capabilities of the two buffering frames 41, two air-cushions 412 are further provided. The two air-cushions 412 are arranged in a room formed by bent parts of the plurality of bent pipes 411 and the vehicle body 1. Since the air-cushions 412 themselves are inflated elastic members, when the buffering frames 41 are subjected to an impact force, the bent pipes 411 are deformed and transfer the impact force to the air-cushions 412, and the air-cushions 412 absorb a part of the impact force by deformation, thereby improving the capabilities of buffering impact forces of the buffering frames 41 themselves.

As shown in FIG. 1, the connecting frame 42 comprises a plurality of longitudinal rods 421 and a plurality of horizontal rods 422, the plurality of longitudinal rods 421 are arranged longitudinally and in parallel along the chassis 2, and the buffering frames 41 are connected with two ends of each of the longitudinal rods 421 respectively; the plurality of horizontal rods 422 are arranged horizontally and in parallel along the chassis 2, one end of each of the horizontal rods 422 is connected to the longitudinal rods 421, and the other end of each of the horizontal rods 422 is connected to the chassis 2.

When the buffering frames 41 are subjected to an impact force, the impact force can be buffered and absorbed by the following means: 1) the impact force is absorbed by the buffering frames 41 themselves; 2) the impact force is absorbed by axial contractions and deformations of the longitudinal rods 421; 3) the longitudinal rods 421 are subjected to the impact force and generate a longitudinal movement, which makes the horizontal rods 422 be deformed and absorb the impact force; 4) the horizontal rods 422 transfer the impact force to the chassis 2, thereby making the chassis 2 be deformed and absorb the impact force. The impact force is dispersed to the various parts mentioned above, the impact forces that are directly absorbed by these parts are reduced, a "cask effect" is avoided, so that the whole vehicle body 1 has no weakness and can bear much larger impact forces.

As shown in FIG. 1, each of the longitudinal rods 421 comprises a front longitudinal rod and a rear longitudinal rod, a front end of the front longitudinal rod is connected to the buffering frame 41 located at a front end of the vehicle body 1, and a rear end of the front longitudinal rod is connected to a crossbeam on the chassis 2 of the vehicle body 1. The rear longitudinal rod has a similar structure, a rear end of the rear longitudinal rod is connected with the buffering frame 41 located at a rear end of the vehicle body 1, and a front end of the rear longitudinal rod is connected with a crossbeam on the chassis 2 of the vehicle body 1. This structure connected to the crossbeams reduces the impact force applied to the horizontal rods 422 in an impacting process and increases the impact force that can be suffered by the chassis 2, so that the longitudinal rods 421 are more stable.

However, each of the front longitudinal rod and the rear longitudinal rod of each of the longitudinal rods 421 is constituted by a plurality of rod bodies connected end to end, and elastic buffering members 4213 are arranged at connection joints between the rod bodies. In the impact force absorbed by the aforesaid means 2, a part of the impact force is absorbed by a plurality of deformable elastic buffering members 4213 arranged along the rod bodies of the longitudinal rods 421. When the impact force is too large, the longitudinal rods 421 can be fractured, taking the elastic buffering members 4213 as the fracturing nodes. When the longitudinal rods 421 are fractured, a part of the impact force is released; moreover, after the longitudinal rods 421 are fractured, the rest part of the vehicle body anti-collision structure and the chassis 2 can be protected, so that a function similar to "an electric circuit fuse wire" can be provided to the vehicle body anti-collision structure in the impacting process.

The elastic buffering members 4213 can have various structures, such as a rubber pad having adhesives arranged at two sides thereof, a spring pillar having a fixed member, and so on. Specifically, in this embodiment, a connecting end of each of the rod bodies is provided with a plurality of insertion holes, the elastic buffering members 4213 are elastic rubber blocks (not shown in the figures), and two ends of each of the elastic rubber blocks are provided with a plurality of plug connectors configured to be inserted into and fixed within the insertion holes. After the plug connectors on the two ends of one of the elastic rubber blocks are all inserted into the insertion holes of adjacent rod bodies, the adjacent rod bodies can be connected together; the rod bodies connected together have an excellent straightness and does not need any additional fixing member, and it is very convenient to assemble and disassemble the rod bodies. The elastic rubber blocks themselves have elasticity capabilities and are stretchable; when they are subjected to a too large impact force, the insertion holes can be cracked, and the elastic rubber blocks can break away from the longitudinal rods 421, such that the longitudinal rods 421 are fractured; in a subsequent repairing procedure, it only needs to replace those fractured rod bodies.

As shown in FIG. 2, each of the rod bodies comprises a straight rod 4211 extending straightly and a bent rod 4212 having a curved shape. Since the chassis 2 is provided thereon with various structures such as vehicle wheel axles, an engine, and so on, in order to avoid an occurrence of interference, the longitudinal rods 421 must keep away from relevant structures; however, if a whole arrangement direction is changed in order to avoid relevant structures, the change of the whole arrangement direction may have a great influence to the vehicle body anti-collision structure. However, each of the longitudinal rods 421 in this embodiment is spliced by a plurality of rod bodies, therefore, it only needs to arrange the straight rods 4211 and the bent rods 4212 and arrange them in an appropriate way, the relevant structures can be avoided using the bent rods 4212, and there is no need to change the whole longitudinal rods 421.

Since the longitudinal rods 421 need to absorb the impact forces by axial contractions and deformations, and the bent rods 4212 are prone to be fractured when they deform axially, a vibration absorbing frame is provided. The vibration absorbing frame can absorb vibration and impaction transferred to the bent rods 4212, and provides a function of enhancing the strength of the bent rods 4212. The arrangement of the vibration absorbing frame can have various structure types, which need to be suited to bent directions of the bent rods 4212 in theory, and should not generate interference with relevant structures on the chassis 2. In an actual application, an appropriate shape of the vibration absorbing frame can be designed according to the aforesaid principle, so that the vibration absorbing frame bears axial deformations together with the bent rods 4212 and disperses impact forces received when it is deformed. The vibrant absorbing frame adopted by this embodiment is connected to the bent rods 4212 through two uprights.

In order to enhance an anti-collision capability of the periphery of the vehicle body 1, an inner side of the vehicle body 1 can be provided with a plurality of air bags, thereby absorbing impact forces coming from lateral directions.

The aforementioned embodiments are only preferred embodiments of the present invention, and should not be regarded as being any limitation to the present invention. Any modification, equivalent replacement, improvement, and so on, which are made within the spirit and the principle of the present invention, should be included within the protection scope of the present invention.

The invention claimed is:

1. A vehicle body anti-collision structure mounted on a periphery of a vehicle body and configured for buffering an impact force applied to the vehicle body, wherein the vehicle body anti-collision structure comprises two buffering frames configured for buffering a received impact force and a connecting frame; the connecting frame is positioned at a bottom end of the vehicle body and is fixed to a chassis of the vehicle body, the two buffering frames are respectively positioned at a front end and a rear end of the vehicle body and fixed to two ends of the connecting frame;

wherein the connecting frame comprises a plurality of longitudinal rods and horizontal rods, the longitudinal rods are arranged longitudinally and in parallel along the chassis, the horizontal rods are arranged horizontally and in parallel along the chassis; the two buffering frames are connected to two ends of each of the longitudinal rods respectively; each of the horizontal rods has one end connected with the longitudinal rods, and another end connected with the chassis;

each of the longitudinal rods comprises a front longitudinal rod and a rear longitudinal rod independent from each other, a front end of the front longitudinal rod is connected to a first buffering frame of the two buffering frames located at the front end of the vehicle body, and a rear end of the front longitudinal rod is connected to the chassis, a rear end of the rear longitudinal rod is connected with a second buffering frame of the two buffering frames located at the rear end of the vehicle body, and a front end of the rear longitudinal rod is connected with the chassis; and each of the front longitudinal rods and the rear longitudinal rods is constituted by a plurality of rod bodies connected end to end, and elastic buffering members are arranged at connection joints between the rod bodies.

2. The vehicle body anti-collision structure according to claim 1, wherein each of the first buffering frame and the second buffering frame comprises a plurality of bent pipes arranged in parallel, and each of the bent pipes has a middle portion bent outwards, an upper end that abuts against the vehicle body, and a lower end connected to the connecting frame.

3. The vehicle body anti-collision structure according to claim 2, wherein the upper end of each of the bent pipes is sheathed by a buffering rubber mat, and a tail end of the buffering rubber mat expands to be trumpet-shaped and abuts against the vehicle body.

4. The vehicle body anti-collision structure according to claim 3, wherein each of the first buffering frame and the second buffering frame further comprises an air-cushion, and the air-cushion is arranged between bent parts of the bent pipes and the vehicle body.

5. The vehicle body anti-collision structure according to claim 1, wherein each of the rod bodies comprises a straight rod extending straightly and a bent rod having a curved shape.

6. The vehicle body anti-collision structure according to claim 5, further comprising a plurality of air bags arranged at an inner side of the vehicle body.

7. The vehicle body anti-collision structure according to claim 1, wherein each of the elastic buffering members is a rubber pad having adhesives arranged at two sides thereof.

8. The vehicle body anti-collision structure according to claim 1, wherein each of the elastic buffering members is a spring pillar having a fixed member.

9. The vehicle body anti-collision structure according to claim 1, wherein the two buffering frames are positioned in an interior of a shell of the vehicle body respectively.

10. The vehicle body anti-collision structure according to claim 5, wherein the bent rods are arranged to be kept away from structures including vehicle wheel axles and an engine arranged on the chassis without a change in an arrangement direction of the straight rods.

\* \* \* \* \*